Sept. 16, 1924.

H. B. SHERMAN ET AL

NOZZLE

Filed Jan. 21, 1922

1,508,993

INVENTOR:
Howard B. Sherman
Frederick Hanlan
By Alexander & Dowell
ATTORNEYS

Patented Sept. 16, 1924.

1,508,993

UNITED STATES PATENT OFFICE.

HOWARD B. SHERMAN AND FREDERICK HANLAN, OF BATTLE CREEK, MICHIGAN, ASSIGNORS TO H. B. SHERMAN MANUFACTURING CO., OF BATTLE CREEK, MICHIGAN, A CORPORATION OF MICHIGAN.

NOZZLE.

Application filed January 21, 1922. Serial No. 530,836.

*To all whom it may concern:*

Be it known that we, HOWARD B. SHERMAN and FREDERICK HANLAN, citizens of the United States, residing at Battle Creek, in the county of Calhoun and State of Michigan, have invented certain new and useful Improvements in Nozzles; and we hereby declare that the following is a full, clear, and exact description thereof, reference being had to the accompanying drawings, which form part of this specification.

This invention is an improvement in hose nozzles of the general type shown in Patents #742,133; #797,927 and #856,816, and the object of the present invention is to provide a nozzle which will be very neat in appearance; simple and economical to manufacture; and more efficient in operation. Also to provide a nozzle which will throw a uniform spray, or stream, and by which the water can be absolutely shut off when desired.

The accompanying drawings illustrate a nozzle embodying the invention which will be explained with reference thereto; the claims set forth the essential features of the invention and novel features of construction and novel combinations of parts for which protection is desired.

Figure 1:
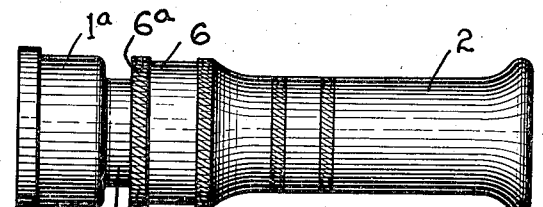
Fig. 1 is a side view of the complete nozzle.
Figure 2:
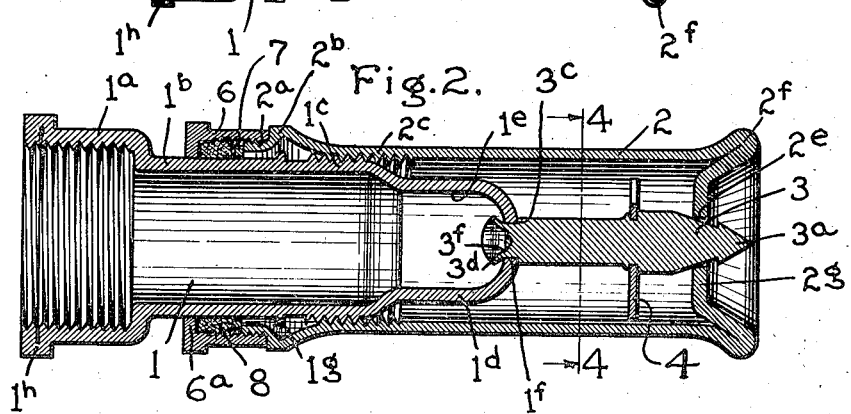
Fig. 2 is an enlarged longitudinal sectional view of the nozzle closed.
Figure 3:
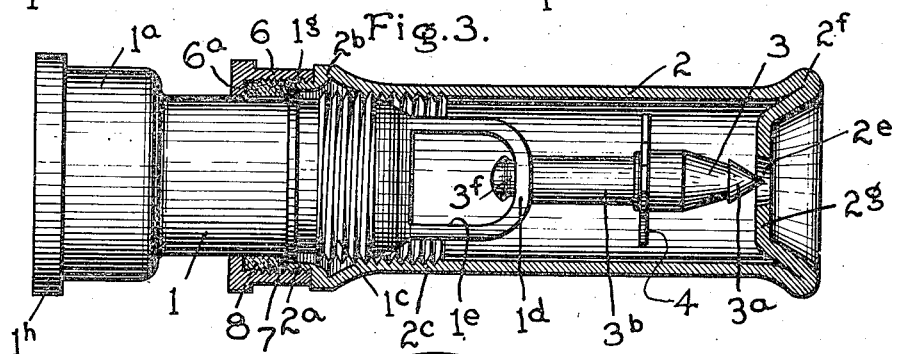
Fig. 3 is a similar view thereof showing the nozzle opened.
Figure 4:
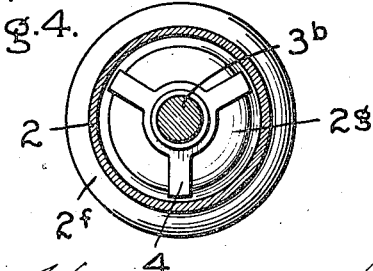
Fig. 4 is a transverse section on the line 4—4 Fig. 2.

The nozzle as shown comprises a spindle 1 and a base or hose-end portion $1^a$, which are preferably formed integral of sheet brass. The base $1^a$ is internally threaded for engagement with the nipple of a hose in the usual manner. The spindle is tubular and cylindric and is adapted to telescope into the sleeve 2, hereinafter described, and is provided adjacent the base $1^a$ with a smooth outer surface portion $1^b$, and beyond this portion with an externally threaded portion $1^c$, for engagement with internal threads of the sleeve; and beyond the threaded portion $1^c$ with a slightly contracted portion $1^d$ which is provided with openings $1^e$ in opposite sides and is preferably closed at its outer end but has an axial aperture $1^f$ therein for engagement with the end of the valve stem 3 hereinafter referred to.

On the spindle 1 between the part $1^a$ and the short portion $1^c$ is a limiting flange $1^g$ which is preferably formed on the exterior of part $1^a$ by spinning the metal upward. This of course could not be done satisfactorily in a brass casting but may be done when the parts are made of drawn metal.

The base and spindle are preferably made integral from sheet brass by successive drawing operations, and the outer end of the base 1 is thickened by suitable drawing operations to form an exterior stiffening flange $1^h$.

Slidably mounted upon the spindle 1 is a sleeve 2 which is longer than the portion $1^b$ of the member 1 and is adapted to telescope thereupon. The sleeve is preferably made from sheet brass by drawing operations. The inner end of the sleeve which is nearest the base is of an internal diameter to slip over flange $1^g$ and loosely fit on the spindle $1^b$, and is externally threaded as at $2^a$ for engagement of a nipple 6. This nipple may be made from rod brass or may be drawn from sheet brass, and has a flange $6^a$ preferably closely fitted to the exterior of the part $1^b$. The nipple may be slipped on the spindle before the limiting flange $1^g$ is formed thereon. A washer or gasket 8 is placed around the part $1^b$ within the nipple and between the flange $6^a$ of the nipple and the end of the part $2^a$ of the sleeve 2. A metal ring or gasket 7 is also preferably placed on the spindle between the gasket 8 and the end of the part $2^a$ of the sleeve as shown, the gasket 8 makes a close water tight slidable joint between the nipple and sleeve and the spindle.

The sleeve 2 is preferably flared outwardly and thickened as at $2^b$ just above the part $2^a$, one side of this thickened portion forms a shoulder against which the end of the nipple 6 abuts, and beyond the part $2^b$ the sleeve extends in tubular cylindric form for some distance beyond the end $1^d$ of the member 1. The sleeve is internally threaded as at $2^c$ to engage the external threads $1^c$ of the spindle so that by turning the sleeve on the spindle the sleeve will be moved longitudinally of said spindle. The telescopic movement of the hose member and sleeve are limited by the packings 7 and 8 and nipple so that they cannot be separated by the longitudinal movement of the sleeve on the spindle.

The sleeve 2 has its outer end closed by an integral head 2ᵍ, the metal of the sleeve being turned inwardly upon itself to form this part 2ᵍ and the inturned portion forming a flange 2ᶠ as shown. In the center of the part 2ᶠ is formed an axial aperture 2ᵒ for the escape of water, which aperture is adapted to be closed by a valve 3.

The valve 3 and its stem 3ᵇ are preferably formed integrally out of rod brass. The valve has on its outer end a tip or point 3ᵃ which is preferably conical and slightly larger in diameter at its base than the point of the valve 3, but is smaller in diameter than aperture 2ᵒ so the tip 3ᵃ can pass through the aperture 2ᵒ while the body of the valve 3 will close the opening if sufficiently projected thereinto.

The valve stem 3ᵇ extends axially of the sleeve 2 and its inner end is so connected to part 1ᵈ of the spindle that the stem will be moved by and with the hose member, but is capable of slight lateral vibration and preferably free rotatorial motion thereon. As shown the stem has a contracted cylindric end 3ᶠ of smaller diameter than the aperture 1ᶠ, in the part 1ᵈ of the spindle and passes therethrough, the valve stem being loosely connected to the part 1ᵈ by the part 3ᶠ, which has a shoulder 3ᶜ at one side of opening 1ᶠ and the opposite end of the part 3ᶠ is flared or spread outwardly as at 2ᵈ at the other side of the opening 1ᶠ.

The shoulder 3ᶜ enables the spindle to force the valve outwardly and into the opening 2ᵒ when the sleeve 2 is turned so as to cause it to move on the spindle toward the base 1ᶜ and more or less open the aperture or close it water tight. To the stem 3ᵇ just below the valve head 3 is connected a spider or guide 4, which is slidable in the sleeve 2 and is adapted to center the point of valve 3 in the discharge orifice 2ᵒ. When the tip of valve has been entered in the aperture the water itself will automatically center the valve or point 3ᵃ in the discharge aperture because of the yieldable or floating connection of the valve to the spindle 1.

Nozzles are sold at a very low price and necessarily they cannot be made so accurate as though they were a high priced article and in such nozzles the valves frequently do not travel axially of the sleeve, and therefore spray one sided or irregularly and do not close tightly.

In our nozzle however the valve 3 practically floats to center and is centered by the water pressure when spraying and will absolutely shut off the water when closed. The spider or guide 4 ensures entering of the point 3ᵃ in the discharge orifice; and after this has been entered the water itself automatically centers point 3ᵃ in the discharge orifice.

In order that the valve 3 may be self centering it must be loosely connected with the hose member and such connection must be so far removed from the valve seat that the valve will adjust itself to the center. In order to enable the valve to readily float to center without getting too far out of position, the centering spider or guide 4 device is used, the front spider and back lower support ensuring that the valve properly enters the aperture 2ᵒ, and enabling the water pressure to automatically center the valve therein for spraying.

The nozzle has the appearance of being very heavy and is of larger size than the aforesaid nozzles. The drawn sheet metal parts are so formed as to secure thickness where strength is essential, without making it necessary to use heavy, thick stampings and cut away metal by lathe operations to form necessary thin projections. At 1ᵇ the metal is doubled to form a strong, heavy, substantial flange, and this result is again secured at point 2ᶜ of the sleeve.

With this invention the complete hose end member may be formed integral of drawn metal; the complete sleeve may be formed integral of drawn metal; the valve and stem may be formed integral out of rod metal; the spider or guide 4 can be stamped; and the nipple 6 may be drawn, or made of rod metal.

With this invention water can be thrown in a solid stream, as a spray, or entirely shut off. When the point 3ᵃ is withdrawn or nearly withdrawn from the orifice of the sleeve 2 the nozzle will throw a solid stream. As the valve is advanced toward the seat the nozzle throws a coarse, or medium or fine spray, and when the valve seats the water is fully cut off.

What we claim is:

1. In a nozzle; a sleeve having an outlet opening; a nipple; a combined base and spindle formed integrally from drawn metal, the base being tubular and having a thickened external peripheral flange on its outer end formed by doubling the metal upon itself, and internally threaded for engagement with the nipple; the spindle being tubular and of less diameter than the base and having an intermediate thickened portion externally threaded for engagement with the sleeve, and having its inner end portion further reduced in diameter and closed at its inner extremity but provided with lateral openings in front of the threaded portion, said openings being so formed as to permit part of the water to flow longitudinally of the spindle directly therefrom into the sleeve; and a valve loosely connected with the reduced inner end of the spindle and adapted to close the outlet opening.

2. In a nozzle having a base, a spindle, and a nipple; a sleeve formed of drawn metal, and externally threaded at one end for engagement with the nipple, and having an expanded and thickened portion at the inner end of the said threaded portion formed by upsetting the metal of the sleeve during the drawing thereof, said sleeve also having another thickened portion formed by upsetting the metal during the drawing thereof, said latter thickened portion being internally threaded to engage a threaded portion of the spindle; said sleeve also having its outer end inturned to form a concave-convex closure having an axial orifice; and a valve loosely connected with the inner end of the spindle and adapted to close said orifice.

3. In a nozzle; a base; a spindle; a sleeve having an outlet orifice; a valve member having a conical head adapted to close the said orifice, and an integral inwardly extending stem, the inner end of the stem being loosely connected to the inner end of the spindle within the sleeve, so that the valve may have lateral play on the spindle in the sleeve; and a guide spider attached to the valve stem and slidably supporting the valve in the sleeve while permitting slight lateral movement thereof.

4. The herein described nozzle, comprising a combined base and spindle formed integrally from drawn metal, the base being tubular and having a thickened external peripheral flange on its outer end formed by doubling the metal upon itself, and internally threaded for engagement with a nipple; the spindle being tubular and of less diameter than the base and having an intermediate thickened portion externally threaded for engagement with threads in the sleeve, and having its inner end portion further reduced in diameter and closed at its inner extremity but provided with openings in front of the threaded portion to permit part of the water to flow longitudinally of the spindle into the sleeve; said spindle also having an exterior shoulder or flange intermediate the said thickened threaded portion and the base; an integral sleeve formed of drawn metal adapted to telescope the spindle and externally threaded at one end, and having an expanded and thickened shoulder portion at the inner end of the said threaded portion formed by upsetting the metal of the sleeve during the drawing thereof; said sleeve also having another thickened portion formed by upsetting the metal during the drawing thereof said thickened portion being internally threaded to engage the externally threaded portion of the spindle; said sleeve also having its outer end inturned to form a concave-convex closure having an axial orifice; a nipple engaging the threaded end of the sleeve and rotatably confining the sleeve to the spindle; a valve for closing the orifice in the sleeve, said valve having an inwardly extending stem loosely connected to the inner end of the spindle within the sleeve; and a guide attached to the valve stem and slidably supporting the valve in the sleeve.

In testimony that we claim the foregoing as our own, we affix our signatures.

HOWARD B. SHERMAN.
FREDERICK HANLAN.